C. CONLON.
MECHANICAL MOVEMENT.
APPLICATION FILED NOV. 11, 1916.

1,344,989.

Patented June 29, 1920.
2 SHEETS—SHEET 1.

WITNESSES
Guy M. Spring
Lloyd W. Patch

INVENTOR
Charles Conlon

Richard B. Owen.
ATTORNEY

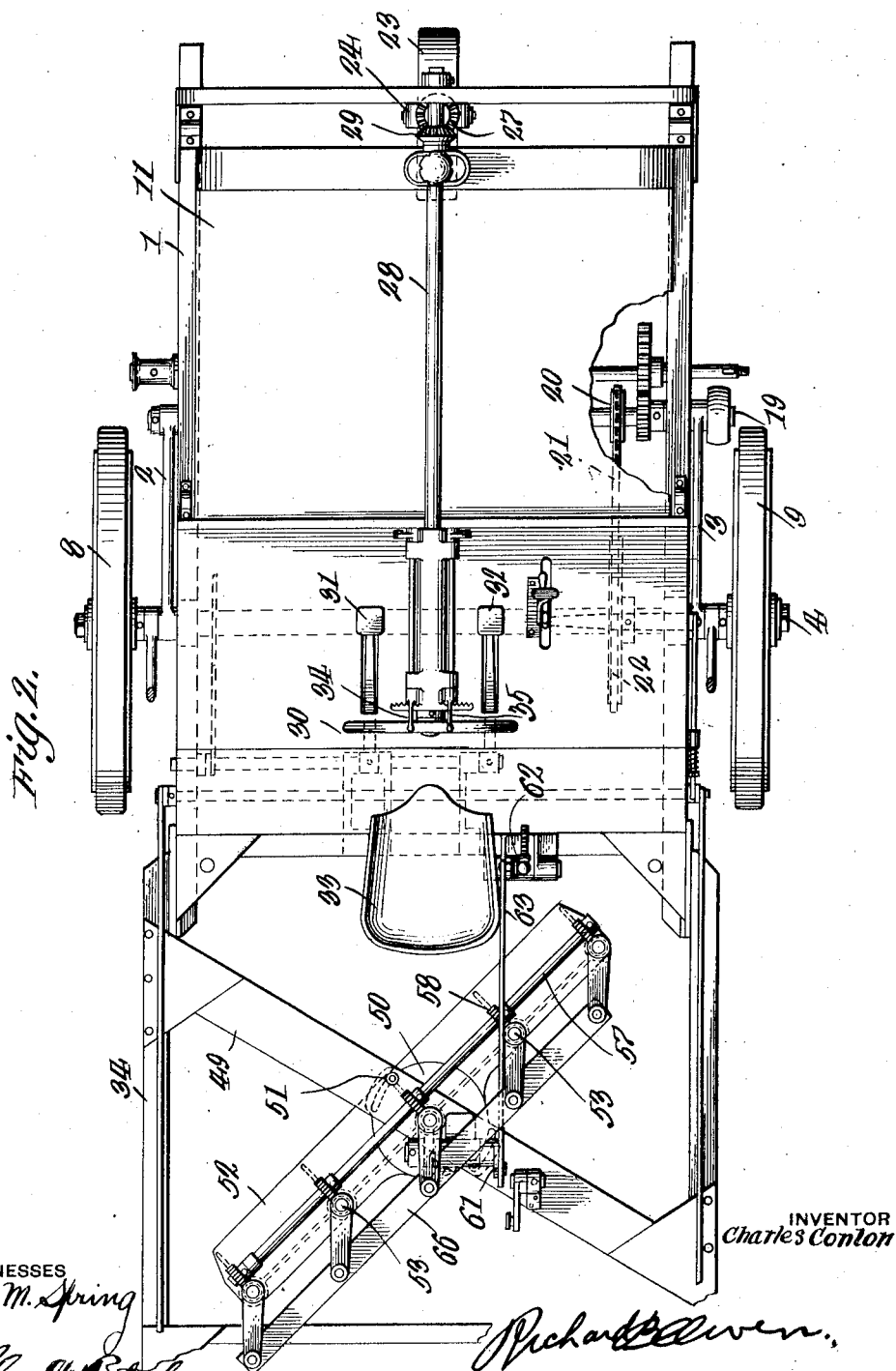

UNITED STATES PATENT OFFICE.

CHARLES CONLON, OF LYNBROOK, NEW YORK.

MECHANICAL MOVEMENT.

1,344,989.  Specification of Letters Patent.  Patented June 29, 1920.

Application filed November 11, 1916. Serial No. 130,857.

*To all whom it may concern:*

Be it known that I, CHARLES CONLON, a citizen of the United States, residing at Lynbrook, in the county of Nassau and State of New York, have invented certain new and useful Improvements in Mechanical Movements, of which the following is a specification.

This invention relates to a mechanical movement whereby a plurality of members may be vertically adjusted in unison and is particularly adapted to be used in agricultural machinery as will be hereinafter more fully described.

A still further object consists in so mounting the main structure upon the supporting and traction wheel, that slight movement of the supporting frame structure with respect to said wheels is permitted to thus give a certain degree of flexibility which will compensate for irregularities in the surface over which the implement is being used.

With the above and other objects in view, my invention consists in certain novel features of construction and combinations of parts which will be hereinafter set forth in connection with the drawings and then more particularly pointed out in the claims.

In the drawings:—

Fig. 2 is a top plan view of the structure disclosed in Fig. 1.

Figure 1:
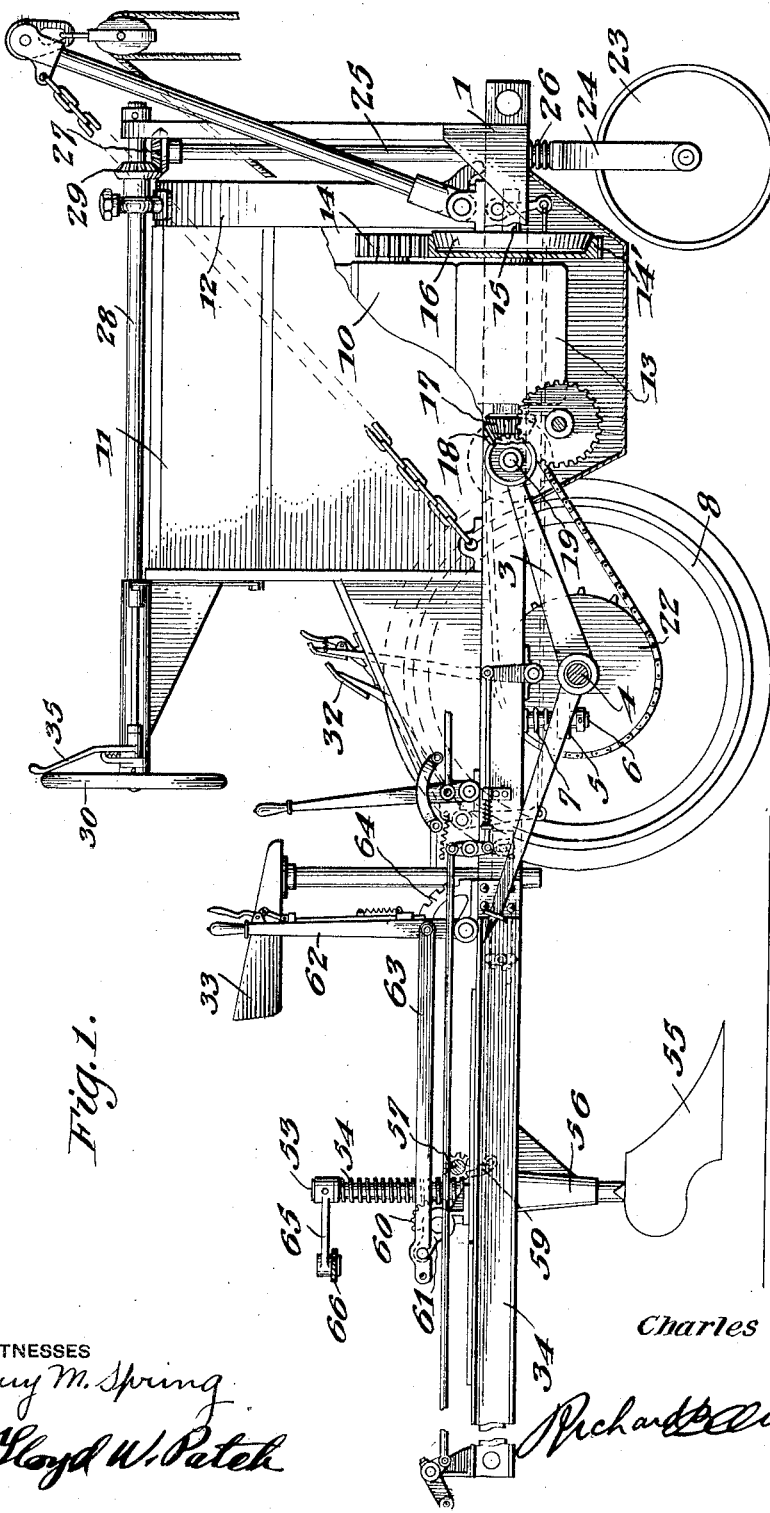
Figure 1 is a view in side elevation showing the device of my invention fitted as a plow.

A frame 34 is mounted at the rear of the frame portion 1 to be capable of swinging movement.

A cross bar 49 which is constructed as a part of the frame portion 34 has a plate 50 mounted at the approximate center thereof and arranged to be capable of turning movement, the clamp bolts 51 being provided to be tightened down to retain this turning plate 50 in any desired adjustment within the length of securement of said clamp bolt. A supporting bar 52 is carried by the turning plate 50 and the plow shafts 53 are extended through spaced apart openings in this supporting bar 52 and are arranged to be capable of vertical adjustment. These plow supporting shafts 53 are preferably substantially cylindrical and have rack teeth formed thereon as shown at 54 to extend entirely around the periphery of the shaft. The plow shares 55 are mounted on the lower end of these shafts 54 and as a general proposition the shafts and the plow shares are free to have sliding movement through the bearings 56 provided on the cross bar 52. A shaft 57 is mounted on the supporting bar 52 adjacent to the mounting of the plow supporting shafts 53 and the gear wheels 58 are secured on this shaft 57 with the teeth thereof in mesh with the racks 54 as provided on the shafts 53 so that as the shaft 57 is locked, the gear wheels will be held against turning and in consequence the plow supporting shafts 53 will be secured against vertical movement within the bearing portions 56. A dog 59, as shown in dotted lines in Fig. 1, is mounted on the supporting bar 52 and is so arranged that it may be swung to engage with the teeth of one of the gear wheels 58 and in consequence to lock the shaft 57 against turning. As the several gear wheels are fixed on the shaft 57, turning of the shaft will give the desired equal adjustment to all of the plow supporting shafts 53 and will consequently bring all of the plow shares 55 to be disposed at the same height. A segmental rack 60 is mounted on a suitable bearing provided on the cross bar 49 and has the teeth thereof meshing with the rack teeth 54 of one of the shafts 53, an arm 61 being provided in conjunction with this segmental rack to accomplish operation of the same. An operating lever 62 is mounted at a point upon the frame structure so that it is readily accessible from the operator's seat and has the link 63 connected therefrom to the operating arm 61 of the segmental member 60, so that as the operating lever 62 is swung in the one direction or the other, assuming that the dog 59 has been released, this segmental rack 60 will cause the particular plow supporting shaft with which it is associated to be raised or lowered and through the fact that the gear wheels 58 mesh with the teeth or rack formations on each of the shafts, this shaft 57 will be turned and all of the plow supporting shafts will be given like adjustment to bring the plow shares each to the same elevation. A substantially sector shaped rack 64 is provided to have a latch carried by the operating lever 62 caught therein to hold the adjustment of the segmental rack 60, and if it be desired, the dog 59 can be again returned to its engaged position with that gear wheel 58 with which it is associated so that the shaft 57 will be positively locked against turning. As has been stated, the supporting bar 52 is mounted to the disk or plate 50, to be capable of swinging movement with respect to the frame portion 34, and by adjusting this supporting bar 52 to extend substantially at right angles to the line of draft of the machine or by bringing the same to be angularly disposed, the distances between the furrows will be varied.

It will of course be understood that when shifting of the supporting bar 52 is to be accomplished, means must be provided to maintain the alinement of the plow shares 55 so that they will at all times operate properly and with this in mind I provide a shifting arm 65 on each of the plow supporting shafts 53. A connecting bar or shifting bar 66 is joined with each of the shifting arms 65 at the outer end thereof to be capable of swinging movement, and this connecting bar is preferably set in its middle portion upon a fixed bearing so that irrespective of the shifting movement which may be given to the supporting bar 52, the plow shares 55 will be held at all times to point in a forward direction and to travel in a direct line with the line of movement of the implement.

If desired, the traction wheels and the carrying wheels might have the tread surfaces thereof roughened or ribbed, or these wheels might have cushion tires mounted thereon, and in other ways modifications can be made in the structure. While in the foregoing I have shown only specific attachments or mechanisms as being part of the implement, it will be appreciated from a consideration of the structure as hereinbefore described and as disclosed in the drawings that a number of variations and modifications might be resorted to both in the form and arrangement of the parts as described and also in the fitting of other mechanisms in conjunction with the permanently arranged portions of the implement, and thus, while I have herein shown and described only specific forms, I do not wish to be limited to the exact disclosure but only to such points as may be set forth in the claims.

I claim:

1. In a mechanical movement, a supporting plate, a second plate pivotally connected thereto, a plurality of rack bars mounted through the second mentioned plate, means connecting the bars to insure operation thereof in unison, and means for rigidly holding the second mentioned plate in its adjusted position.

2. In a mechanical movement, a supporting plate, a plurality of rack bars slidably mounted through the plate, means connecting the rack bars to insure operation thereof, in unison, a segment meshing with one of said rack bars, and means adapted to impart movement to the segment whereby movement is imparted to all of said rack bars.

3. In a mechanical movement, a supporting plate, a second plate pivotally connected thereto, a plurality of rack bars slidably mounted through said second mentioned plate, a shaft mounted adjacent said rack bars, a plurality of gears mounted thereon and adapted to mesh with said rack bars, a segment meshing with one of said rack bars, means for imparting movement to said segment whereby said rack bars are adjusted in unison, and means for maintaining said rack bars in alinement.

In testimony whereof I affix my signature in presence of two witnesses.

CHARLES CONLON.

Witnesses:
PEDER HUESS,
OLIVER B. STONE.